Nov. 27, 1923. 1,475,426
E. R. BURTNETT
INTERNAL COMBUSTION ENGINE
Filed April 30, 1923
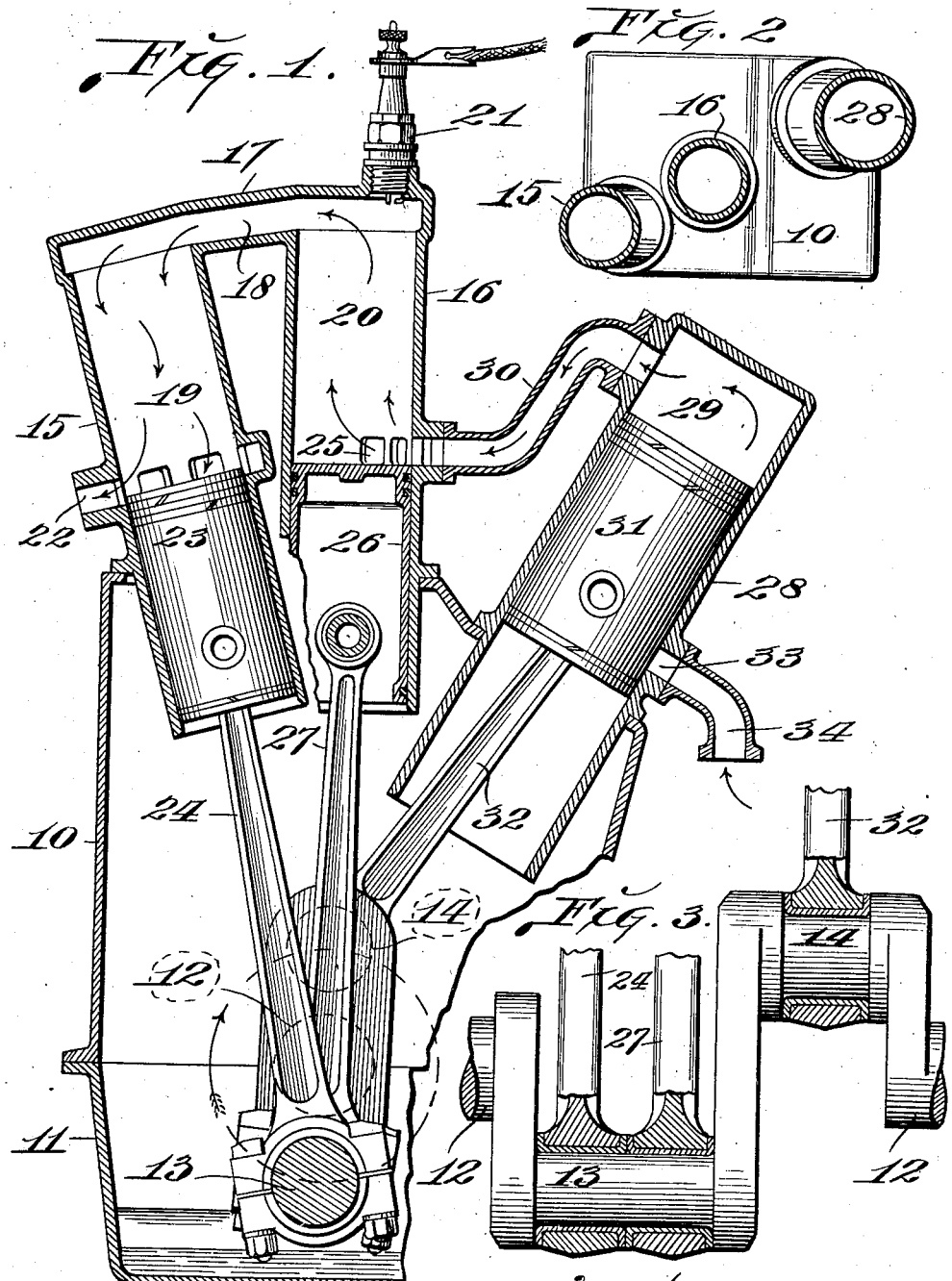

Patented Nov. 27, 1923.

1,475,426

UNITED STATES PATENT OFFICE.

EVERETT R. BURTNETT, OF LOS ANGELES, CALIFORNIA.

INTERNAL-COMBUSTION ENGINE.

Application filed April 30, 1923. Serial No. 635,672.

*To all whom it may concern:*

Be it known that I, EVERETT R. BURTNETT, a citizen of the United States, residing at Los Angeles, in the county of Los Angeles, State of California, have invented new and useful Improvements in Internal-Combustion Engines, of which the following is a specification.

My invention relates generally to internal combustion engines, and more particularly to a charge stratification two stroke cycle engine and among the principal objects of my invention are, to generally improve upon and simplify the construction of the existing forms of two cycle engines, to provide an engine in which uniform operation is obtained at any and all throttle and load conditions and said engine comprising relatively few parts that are of strong, rugged construction, and therefore capable of being easily and cheaply produced and said engine being economical in operation and maintenance, positive in port action and silent in operation.

Further objects of my invention are to provide a two stroke cycle engine wherein crank case compression and its attendant difficulties and objections are eliminated, to provide for the elimination of the loss of a portion of the fresh fuel charge with the spent charge or burnt gases during the scavenging action, to eliminate fuel losses as a result of leakage from the gaseous fuel precompression chamber, and to permit the use of a conventional form of lubricating system, whereby a free and thorough distribution of lubricant may be maintained throughout the crank chamber.

Further objects of my invention are, to provide a two stroke cycle internal combustion engine in which the functions of precompressing the gaseous fuel charge, to develop induction to the combustion chamber is obtained by the use of a pumping cylinder; to provide for a maximum volume transfer of the precompressed gaseous fuel charge from the pumping cylinder to the combustion chamber, and which result is obtained by arranging the pumping cylinder so that its axis is at an angle relative to the axis of the combustion cylinder and radially beyond said combustion cylinder in the direction of crank rotation, and with the pumping cylinder crank and combustion cylinder cranks arranged substantially 180 degrees apart, so that the piston in the precompression pumping cylinder reaches top or head "dead center" (maximum compression) after the combustion cylinder piston has reached crank dead center; to provide a two stroke cycle internal combustion engine functional unit of three cylinders, two of which are formed at the head end into one common chamber, with a piston in each part of the common chamber, and a separate and direct connection in the form of a rod or pitman from each piston to one throw or crank of the crank shaft, the two cylinders having the common combustion chamber being offset with respect to each other lengthwise of the crank shaft, the third cylinder being adapted to charge induction pumping and having a piston that is connected by a rod or pitman to a separate crank or throw of the same shaft to which the two combustion chamber pistons are connected, and said second or pumping cylinder crank throw being disposed substantially opposite to the crank throw to which said combustion chamber pistons are connected; and further to provide a two stroke cycle internal combustion engine unit of three cylinders in which the pistons in all the cylinders serve as valves, while the respective cranks are passing their end dead centers, the three cylinders forming each unit being arranged radially in relation to each other and offset with respect to each other lengthwise of the crank shaft, thereby permitting a very compact and relatively short structure and providing a separate time period for each valve function by the respective pistons and there being a port arranged in the barrel of each cylinder, in position so as to be uncovered by the respective piston head as it passes the corresponding crank end dead center.

In my improved engine, the first cylinder radially in the direction of the crank rotation, is one of the two cylinders forming a single or common combustion chamber and with the piston in this cylinder functioning as an exhaust port valve.

The ports of this first cylinder are opened first or before the opening of the ports of the second or companion combustion cylinder by reason of the fact that the pistons of the two combustion cylinders are connected to the same crank throw and also by reason of the angular arrangement of the two cylinders relative to each other. Thus the exhaust ports in the first cylinder are uncovered before the opening or uncovering of the gaseous fuel inlet or induction ports in the second cylinder and in turn, the exhaust ports close before the inlet ports are fully closed.

During these valve opening and closing operations, there is a short time interval when both inlet and exhaust ports are open, thus permitting the scavenging of a part of the burnt and expanded gases from the combustion chamber by the induction of a fresh gaseous charge from the opposite end of the chamber.

With the foregoing and other objects in view, my invention consists in certain novel features of construction and arrangement of parts that will be hereinafter more fully described and claimed and illustrated in the accompanying drawings in which:

Fig. 1 is a vertical transverse section taken lengthwise through the center of an engine of my improved construction.

Fig. 2 is a diagrammatic view illustrating the offset arrangement of the cylinders of the engine.

Fig. 3 is a side elevational view of the crank shaft of my improved engine.

Referring by numerals to the accompanying drawings, 10 and 11 designate respectively the upper and lower parts of the crank case of my improved engine and formed on the end walls of said crank case are suitable bearings for a crank shaft 12.

This shaft has two cranks 13 and 14 for each unit or set of cylinders in the engine and said cranks are oppositely disposed with respect to each other or arranged 180 degrees apart.

Secured in position on top of the upper member 10 of the crank case are two cylinders 15 and 16 that are angularly disposed with respect to each other so that their axes are radially arranged relative to the axis of the crank shaft.

Further, these two cylinders are slightly offset with respect to each other lengthwise of the crank shaft, so as to produce a compact structure and enable the connecting rods from the pistons to be directly connected to the same crank throw, namely the crank 13.

Cylinder 15 is the first cylinder in the direction of rotation of the crank and the second cylinder 16 occupies a substantially vertical position directly above the crank 12.

The upper ends of the cylinders 15 and 16 are connected by a head 17 that may be formed integral as illustrated, or separately formed if desired, and the chamber 18 within said head connects the piston clearance 19 in cylinder 15 with the piston clearance chamber 20 in cylinder 16.

Thus chambers 18, 19 and 20 constitute a common combustion and expansion chamber in which the compressed gaseous fuel is ignited and expanded.

A spark plug 21 is located at a suitable point in head 17, preferably at the end of chamber 18, directly above chamber 20.

Formed through the intermediate portion of the wall of cylinder 15 is a series of exhaust ports 22 and the escape of burnt gases and products of combustion through these ports is controlled by the piston 23 that is arranged for reciprocatory movement with clearance chamber 19 in said cylinder.

Piston 23 is connected to crank 13 by a connecting rod 24, the length of the latter being such that when said crank is at "low center" in its throw or travel, the head of piston 23 is below the exhaust ports 22 so that the latter are wholly open.

Formed through the intermediate portion of the wall of cylinder 16 and on the opposite side from cylinder 19 is a series of gaseous fuel inlet ports 25.

A piston 26 is arranged for reciprocatory movement within cylinder 16 and serves as a valve to control the passage of gaseous fuel through these ports and connecting said piston to crank 13 is a connecting rod 27.

The length of this rod is such that when crank 13 is at its low center, the head of piston 26 is below the ports 25 so that the same are wholly uncovered.

Located in the upper portion of crank case member 10 in front of cylinder 16, in the direction of crank rotation, is a gaseous fuel precompression and pumping cylinder 28.

This cylinder is disposed so that its axis is angularly arranged relative to the axis of cylinders 19 and 20 and therefore said cylinder is, with said last mentioned cylinders radially disposed with respect to a point adjacent to the axis of crank shaft 12.

Further, this cylinder 28 is offset with respect to cylinders 19 and 20, lengthwise of the crank shaft so that its axis is in line with the center of crank 14.

Leading from the upper portion of the chamber 29 within cylinder 28 to the inlet ports 25 in cylinder 16 is a compressed gaseous fuel duct 30.

Arranged for reciprocatory movement within cylinder 28 is a piston 31 and connecting the same with a crank 14 is a connecting rod 32.

Formed through the intermediate portion of the wall of cylinder 28 is a gaseous fuel inlet port 33 that is connected by a suitable duct 34 that leads to a source of gaseous fuel supply, preferably a carburetor.

Piston 31 performs the functions of a valve in controlling the admission of gaseous fuel through inlet port 33 and the length of the connecting rod 32 is such that when crank 14 and piston 31 are at their low centers, said inlet port is wholly uncovered and open.

When the pistons of my improved engine are in the positions seen in Fig 1, exhaust ports 22 and inlet ports 25 are open, thereby permitting the gaseous fuel charge under high compression in chamber 29 to pass through duct 30 and inlet ports 25 into expansion chamber 20 and from thence through clearance chamber 18 into expansion chamber 19, thereby expelling or scavenging the greater portion of the products of combustion resulting from the previously ignited fuel charge out through exhaust ports 22.

As the crank shaft moves clockwise and crank 13 to which rods 24 and 27 are connected swings upward, pistons 23 and 26 will move simultaneously upward in their respective cylinders, but owing to the angular or radial position of the cylinders 15 and 16, piston 23 travels slightly in advance of piston 26.

As a result, the exhaust ports are fully closed by piston 23 an instant before inlet ports are closed by piston 26 and as both pistons continue their upward movements, the gaseous fuel trapped in the chambers 19, 18 and 20 will be highly compressed, into the clearance chamber 18, and as the pistons pass their high centers or immediately thereafter, a spark is produced between the terminals of the electrodes of plug 21, thereby igniting the compressed charge and the resulting expansion drives the two pistons downward on their power stroke.

An instant after the pistons 23 and 26 pass their high centers, piston 31 is at its low center, thereby admitting a charge of gaseous fuel from the source of supply into chamber 29 through the wholly uncovered port 33.

On the succeeding upward stroke of piston 31 this fuel will be precompressed in chamber 29 and as inlet ports 25 are uncovered, this compressed charge will enter chamber 20 and pass from thence into chambers 18 and 19 as hereinbefore described.

Thus it will be seen that I have produced a two stroke cycle charge stratification internal combustion engine that is of relatively simple, compact, strong and durable structure and which engine is wholly devoid of inlet and exhaust valves and thus operating mechanisms and likewise wholly devoid of the crank case compression functions.

Obviously the size, form and construction of the various parts of my improved engine may be changed slightly in detail, without departing from the spirit of the invention, the scope of which is set forth in the appended claims.

I claim as my invention:

1. In an internal combustion engine, a unit of three radially arranged cylinders that are offset with respect to each other longitudinally of the crank shaft of the engine, two of said cylinders functioning as combustion cylinders and the third cylinder functioning for the pumping and precompressing of gaseous fuel.

2. In an internal combustion engine, a unit of three radially arranged cylinders that are offset with respect to each other longitudinally of the crank shaft of the engine and the chambers in two of said cylinders being formed at their head ends with a content clearance chamber that is common to both.

3. In an internal combustion engine, a unit of three cylinders that are radially disposed with respect to the crank shaft of the engine, and offset with respect to each other lengthwise of said crank shaft, and the chambers in the two first cylinders in the direction of crank rotation being connected in their heads by a common content clearance chamber.

4. In an internal combustion engine, a unit of three cylinders that are radially disposed with respect to the crank shaft of the engine, and offset with respect to each other lengthwise of said crank shaft, the chambers in the first two cylinders in the direction of crank rotation being connected in their heads by a common content clearance chamber, pistons within the chambers in said cylinders and connections from the two pistons to one crank of the crank shaft.

5. In an internal combustion engine, a unit of three radially arranged cylinders that are offset with respect to each other longitudinally of the crank shaft of the engine, two of said cylinders functioning as combustion cylinders, the third cylinder functioning for the pumping and precompression of gaseous fuel, a piston arranged for operation within each cylinder, a crank shaft having two cranks, the pistons in two of the three cylinders being connected to one of said two cranks and the piston in the third cylinder being connected to the other crank.

6. In an internal combustion engine, a unit of three radially arranged cylinders that are offset with respect to each other longitudinally of the crank shaft of the engine, one of said cylinders functioning for the pumping and precompression of gaseous fuel, a piston arranged for operation within each cylinder, a crank shaft having two cranks, the pistons in two of the three cylinders being connected to one of said two cranks, the piston in the third cylinder being connected to the other crank, one of said cylinders being provided with an exhaust port and the other two cylinders being provided with inlet ports.

In testimony whereof I have signed my name to this specification.

EVERETT R. BURTNETT.